United States Patent
Cochran

(10) Patent No.: US 11,390,393 B2
(45) Date of Patent: Jul. 19, 2022

(54) NACELLE WITH A TRANSLATABLE INLET FOR AN AIRCRAFT PROPULSION SYSTEM

(71) Applicant: Rohr, Inc., Chula Vista, CA (US)

(72) Inventor: Michael Cochran, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 489 days.

(21) Appl. No.: 16/431,111

(22) Filed: Jun. 4, 2019

(65) Prior Publication Data
US 2020/0385135 A1     Dec. 10, 2020

(51) Int. Cl.
| | |
|---|---|
| *B64D 29/06* | (2006.01) |
| *B64D 33/02* | (2006.01) |
| *F02C 7/04* | (2006.01) |
| *F02C 7/042* | (2006.01) |
| *F02C 7/047* | (2006.01) |

(52) U.S. Cl.
CPC .............. *B64D 29/06* (2013.01); *B64D 33/02* (2013.01); *F02C 7/04* (2013.01); *F02C 7/042* (2013.01); *F02C 7/047* (2013.01)

(58) Field of Classification Search
CPC ......... B64D 29/06; B64D 33/02; F02C 7/042; F02C 7/047
See application file for complete search history.

(56) References Cited

U.S. PATENT DOCUMENTS

| | | | |
|---|---|---|---|
| 3,058,693 A | 10/1962 | Doak | |
| 3,974,648 A | 8/1976 | Kepler | |
| 5,014,933 A * | 5/1991 | Harm | B64D 33/02 181/215 |
| 7,837,142 B2 | 11/2010 | Chase et al. | |
| 8,181,905 B2 | 5/2012 | McDonough et al. | |
| 9,908,633 B2 | 3/2018 | Huynh et al. | |
| 10,221,764 B2 | 3/2019 | Labrecque et al. | |
| 2010/0084507 A1* | 4/2010 | Vauchel | B64D 33/02 244/1 N |
| 2010/0252689 A1* | 10/2010 | Vauchel | B64D 29/08 244/53 B |

(Continued)

FOREIGN PATENT DOCUMENTS

| | | | | |
|---|---|---|---|---|
| WO | 2009115674 A2 | | 9/2009 | |
| WO | WO-2009115674 A2 * | | 9/2009 | ............. B64D 29/08 |

OTHER PUBLICATIONS

EP search report for EP19212413.9 dated Jun. 29, 2020.

*Primary Examiner* — Richard R. Green
*Assistant Examiner* — Arfan Y. Sinaki
(74) *Attorney, Agent, or Firm* — Getz Balich LLC

(57) ABSTRACT

A nacelle assembly includes a fixed inlet segment and a translating inlet segment. The translating inlet segment includes a slider beam laterally between a pair of tracks of the fixed inlet segment. The slider beam is mated with and slidable longitudinally along the pair of tracks. The translating inlet segment is configured to translate longitudinally between a retracted position and an extended position. An aft end of the translating inlet segment is abutted against a forward end of the fixed inlet segment when the translating inlet segment is in the retracted position. An airflow inlet into an inlet passage of the nacelle assembly is opened longitudinally between the aft end of the translating inlet segment and the forward end of the fixed inlet segment when the translating inlet segment is in the extended position.

18 Claims, 11 Drawing Sheets

(56) References Cited

U.S. PATENT DOCUMENTS

| | | | | |
|---|---|---|---|---|
| 2011/0182727 A1* | 7/2011 | Vauchel | ................. | B64D 29/06 |
| | | | | 415/213.1 |
| 2011/0284095 A1* | 11/2011 | Vauchel | .................... | F02C 7/04 |
| | | | | 137/15.1 |
| 2011/0308634 A1* | 12/2011 | Mouton | ................ | B64D 29/06 |
| | | | | 137/15.1 |
| 2014/0127001 A1* | 5/2014 | Todorovic | ............... | F02C 7/042 |
| | | | | 415/127 |
| 2015/0291284 A1* | 10/2015 | Victor | .................... | B64D 15/04 |
| | | | | 244/134 B |
| 2017/0321633 A1 | 11/2017 | Boileau | | |
| 2018/0371996 A1 | 12/2018 | Hoisington | | |
| 2019/0024609 A1* | 1/2019 | Chuck | ....................... | F02K 1/72 |

\* cited by examiner

NACELLE WITH A TRANSLATABLE INLET FOR AN AIRCRAFT PROPULSION SYSTEM

BACKGROUND

1. Technical Field

This disclosure relates generally to an aircraft propulsion system and, more particularly, to a nacelle assembly for an aircraft propulsion system.

2. Background Information

An aircraft propulsion system typically includes a gas turbine engine housed within a nacelle. Some nacelles may include a translatable inlet. Such a translatable inlet may include an inlet lip structure that moves between a retracted position and an extended position. In the retracted position, the gas turbine engine receives air from a primary airflow inlet defined by the inlet lip structure at its leading edge. In the extended position, the gas turbine engine receives air from the primary airflow inlet as well as a secondary airflow inlet defined between the inlet lip structure and an adjacent aft structure. While these known nacelles with translatable inlets have various advantages, there is a need for improvement.

SUMMARY OF THE DISCLOSURE

According to an aspect of the present disclosure, a nacelle assembly is provided for an aircraft propulsion system. The nacelle assembly includes a fixed inlet segment and a translating inlet segment. The fixed inlet segment includes a pair of tracks. The translating inlet segment includes a slider beam laterally between the pair of tracks. The slider beam is mated with and slidable longitudinally along the pair of tracks. The translating inlet segment is configured to translate longitudinally between a retracted position and an extended position. An aft end of the translating inlet segment is abutted against a forward end of the fixed inlet segment when the translating inlet segment is in the retracted position. An airflow inlet into an inlet passage of the nacelle assembly is opened longitudinally between the aft end of the translating inlet segment and the forward end of the fixed inlet segment when the translating inlet segment is in the extended position.

According to another aspect of the present disclosure, another nacelle assembly is provided for an aircraft propulsion system. This nacelle assembly includes a fixed inlet segment and a translating inlet segment. The fixed inlet segment includes a first track and a second track. The translating inlet segment includes a slider beam slideably mated with each of the first track and the second track. The translating inlet segment is configured to translate longitudinally along a centerline between a retracted position and an extended position. An airflow inlet into aircraft propulsion system, located longitudinally between the translating inlet segment and the fixed inlet segment, is open when the translating inlet segment is in the extended position. The airflow inlet is closed when the translating inlet segment is in the retracted position.

The first track may be located less than one radian from the second track about the centerline.

A lateral width of the slider beam may be less than one half of an outer diameter of the nacelle assembly at an interface between the fixed inlet segment and the translating inlet segment.

The translating inlet segment may also include an outer tubular skin configured with a pair of ribs. The slider beam may be laterally between and mounted to the pair of ribs.

The translating inlet segment may form a second airflow inlet into the inlet passage. The second airflow inlet may be located at a forward end of the translating inlet segment.

The fixed inlet segment may also include a pair of second tracks. The translating inlet segment may also include a second slider beam laterally between the pair of second tracks. The second slider beam may be mated with and slidable longitudinally along the pair of second tracks.

The slider beam and the second slider beam may be arranged at opposing sides of the translating inlet segment.

The slider beam may be configured with an opening that extends radially through the slider beam and increases an effective area of the airflow inlet.

The pair of tracks may be separated by less than one radian.

A lateral width of the slider beam may be less than one half of an outer diameter of the nacelle assembly at an interface where the translating inlet segment abuts against the fixed inlet segment.

The pair of tracks may include a C-channel track.

The slider beam may include a mating feature arranged within a channel of a first of the pair of tracks.

The translating inlet segment may be configured with a pair of ribs that extend longitudinally along a centerline of the nacelle assembly. The slider beam may be positioned laterally between and attached the pair of ribs.

A linear actuator may be mounted to and extend longitudinally between the fixed inlet segment and the slider beam. The linear actuator may be configured to translate the translating inlet segment between the retracted position and the extended position.

The fixed inlet segment may be configured with an access panel for providing access to a mounting connection between the linear actuator and the slider beam when the translating inlet segment is in the retracted position.

The linear actuator may project into a recess in the slider beam such that a mounting connection between the linear actuator and the slider beam is position longitudinally forward of an aft end of the slider beam.

A heating element may be included and configured at a leading edge of the translating inlet segment.

A heating element may be included and configured at a leading edge of the fixed inlet segment.

A heating element may be included and configured with the slider beam.

The foregoing features and the operation of the invention will become more apparent in light of the following description and the accompanying drawings.

DETAILED DESCRIPTION

Figure 1:
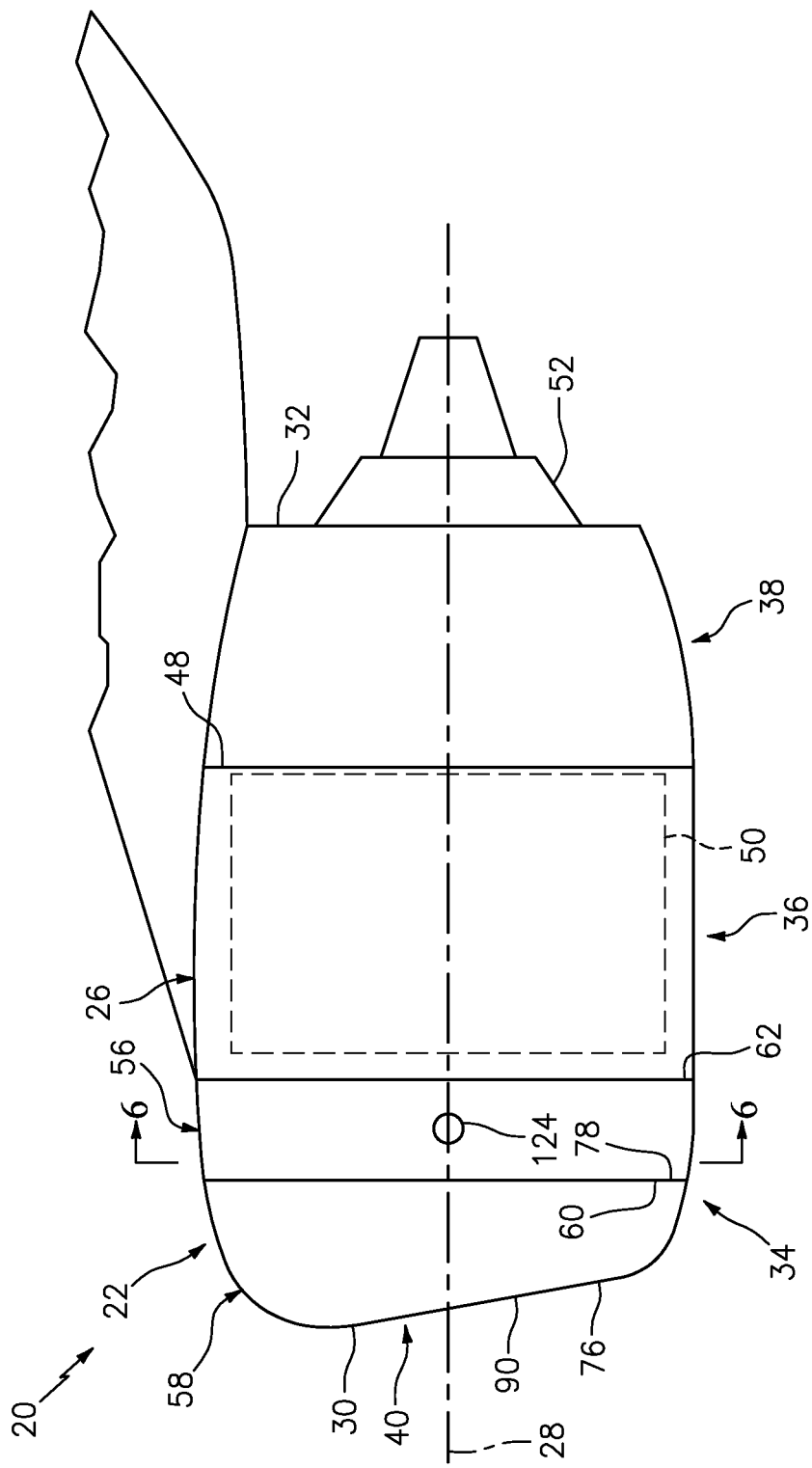
FIG. 1 is a diagrammatic illustration of an aircraft propulsion system with a translatable inlet in a retracted position.
Figure 2:
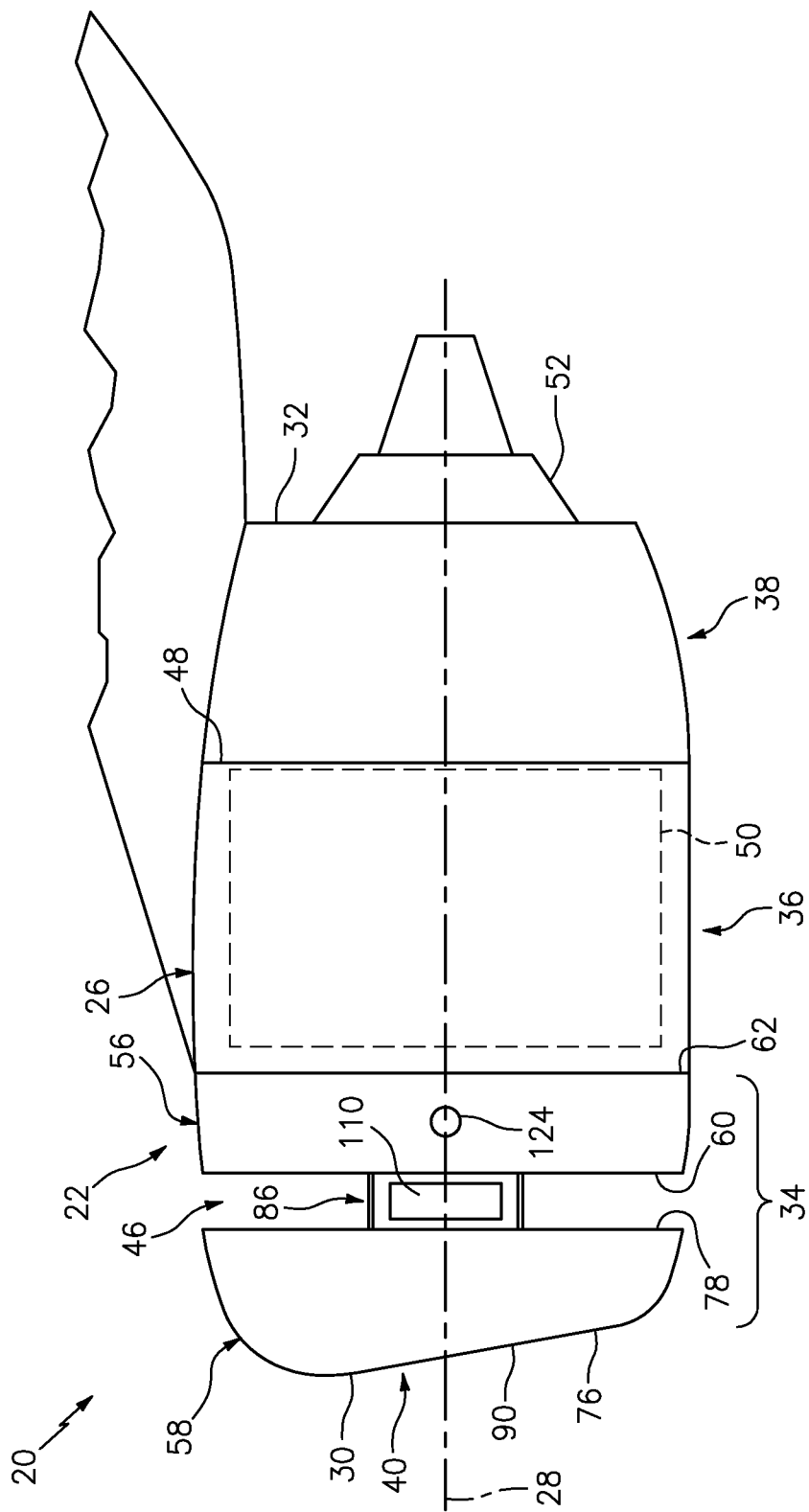
FIG. 2 is a diagrammatic illustration of the aircraft propulsion system with the translatable inlet in an extended position.
Figure 3:
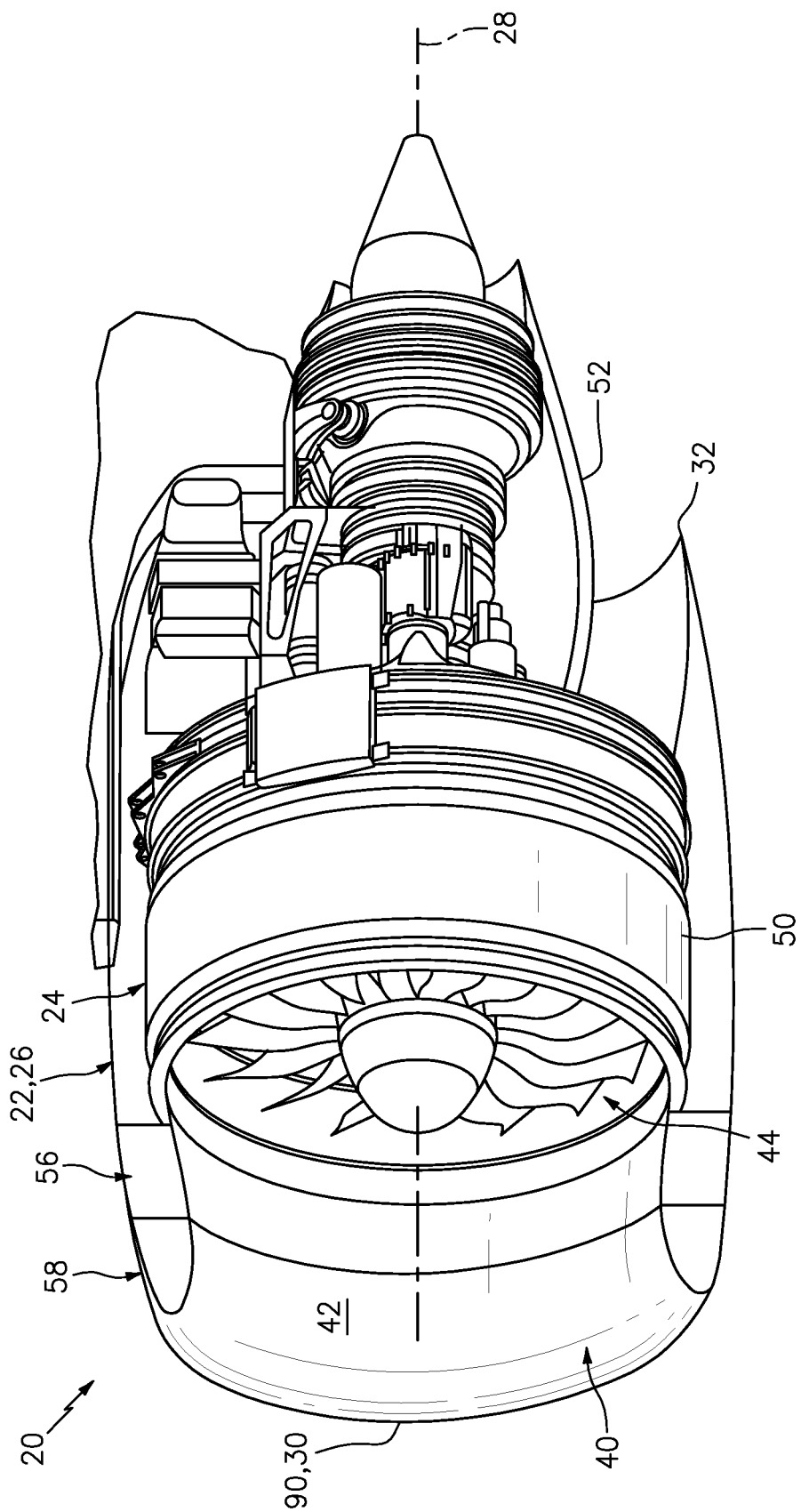
FIG. 3 is a cutaway illustration of the aircraft propulsion system of FIG. 1.

FIGS. 1 and 2 illustrates an aircraft propulsion system 20 for an aircraft such as, but not limited to, a commercial airliner or cargo plane. The propulsion system 20 includes a nacelle 22 and a gas turbine engine 24 (see FIG. 3). This gas turbine engine 24 may be configured as a high-bypass turbofan engine as illustrated in FIG. 3. The present disclosure, however, is not limited to such an exemplary gas turbine engine. For example, the gas turbine engine 24 may alternatively be configured as any other type of gas turbine engine capable of propelling the aircraft during flight such as, for example, a turbojet engine and/or a ramjet engine.

The nacelle 22 is configured to house and provide an aerodynamic cover for the gas turbine engine 24. Referring to FIGS. 1 and 2, an outer structure 26 of the nacelle 22 extends longitudinally along a longitudinal centerline 28 (e.g., an axis) between a nacelle forward end 30 and a nacelle aft end 32. The nacelle 22 of FIG. 1 includes a tubular nacelle inlet structure 34, one or more arcuate fan cowls 36 (one such cowl visible in FIG. 1) and a tubular nacelle aft structure 38, which aft structure 38 may be configured as part of or include a thrust reverser system.

As described below in further detail, the inlet structure 34 is disposed at the nacelle forward end 30. The inlet structure 34 is configured to direct a primary stream of air through a primary airflow inlet 40 (e.g., an approximately circular opening; see also FIG. 3) at the nacelle forward end 30 and into an inlet passage 42. This inlet passage 42 extends through the inlet structure 34 and is configured to direct an airflow into the gas turbine engine 24; e.g., into a fan section 44 of the gas turbine engine 24 (see FIG. 3). Referring to FIG. 2, the inlet structure 34 is also configured to selectively direct a secondary stream of air through a secondary airflow inlet 46 (e.g., an approximately annular opening) and into the inlet passage 42 in order to selectively increase the airflow directed to the gas turbine engine 24 by the inlet passage 42 during certain modes of engine operation.

Referring to FIG. 1, the fan cowls 36 are disposed longitudinally between the inlet structure 34 and the aft structure 38. Each fan cowl 36 of FIG. 1, in particular, is disposed at an aft end 48 of a forward portion of the nacelle 22, and extends longitudinally forward to the inlet structure 34. Each fan cowl 36 is generally axially aligned with the fan section 44 of the gas turbine engine 24 (see FIG. 3). The fan cowls 36 are configured to provide an aerodynamic covering for a fan case 50, which circumscribes the fan section 44 and partially forms an outer peripheral boundary of a bypass flowpath of the propulsion system 20.

The aft structure 38 of FIG. 1 is disposed at the nacelle aft end 32. The aft structure 38 is configured to form a bypass nozzle for the bypass flowpath with an inner structure 52 of the nacelle 22; e.g., an inner fixed structure (IFS). The aft structure 38 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 4:
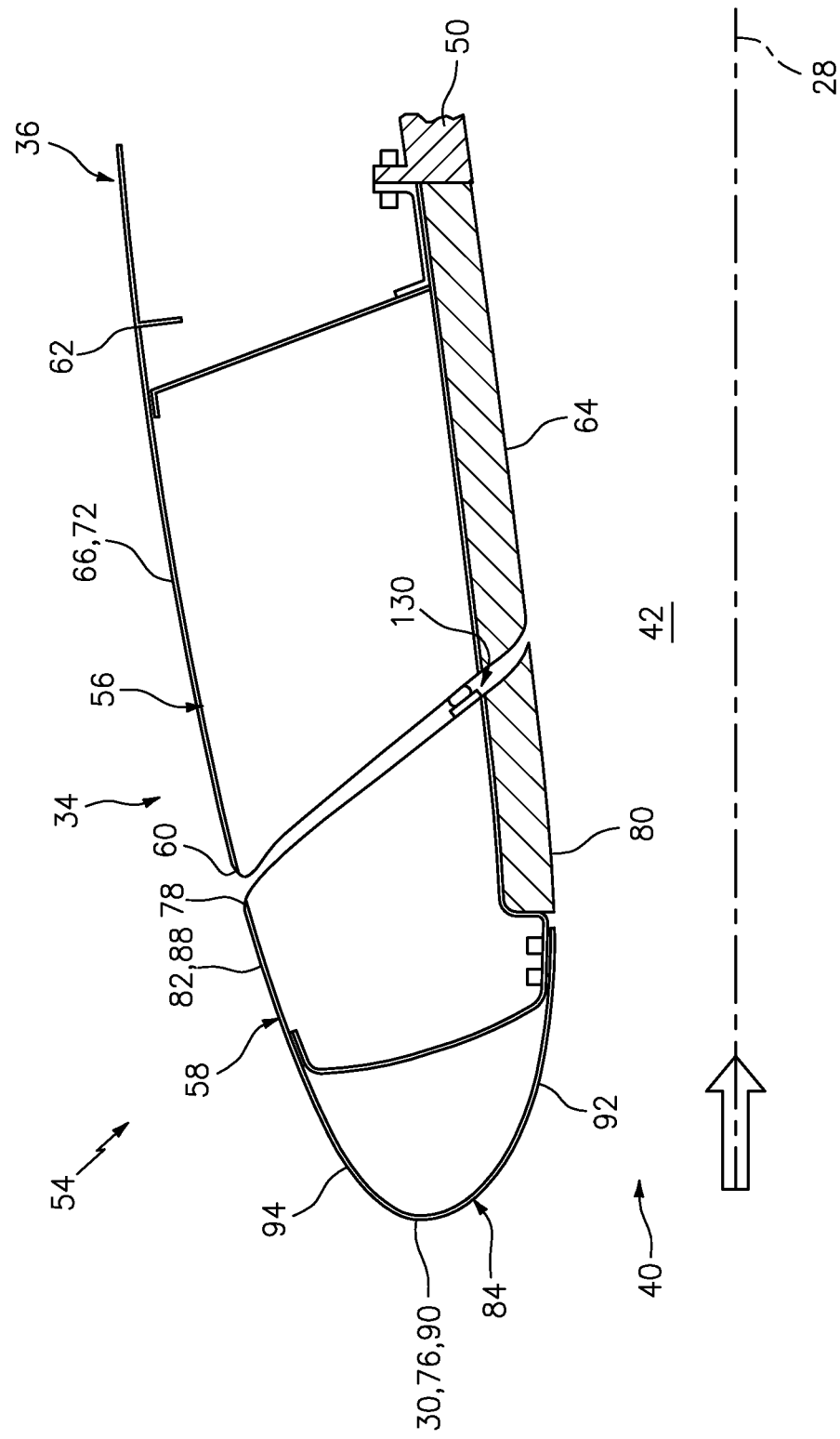
FIG. 4 is a partial side sectional illustration of a forward portion of the aircraft propulsion system with the translatable inlet in the retracted position.
Figure 5:
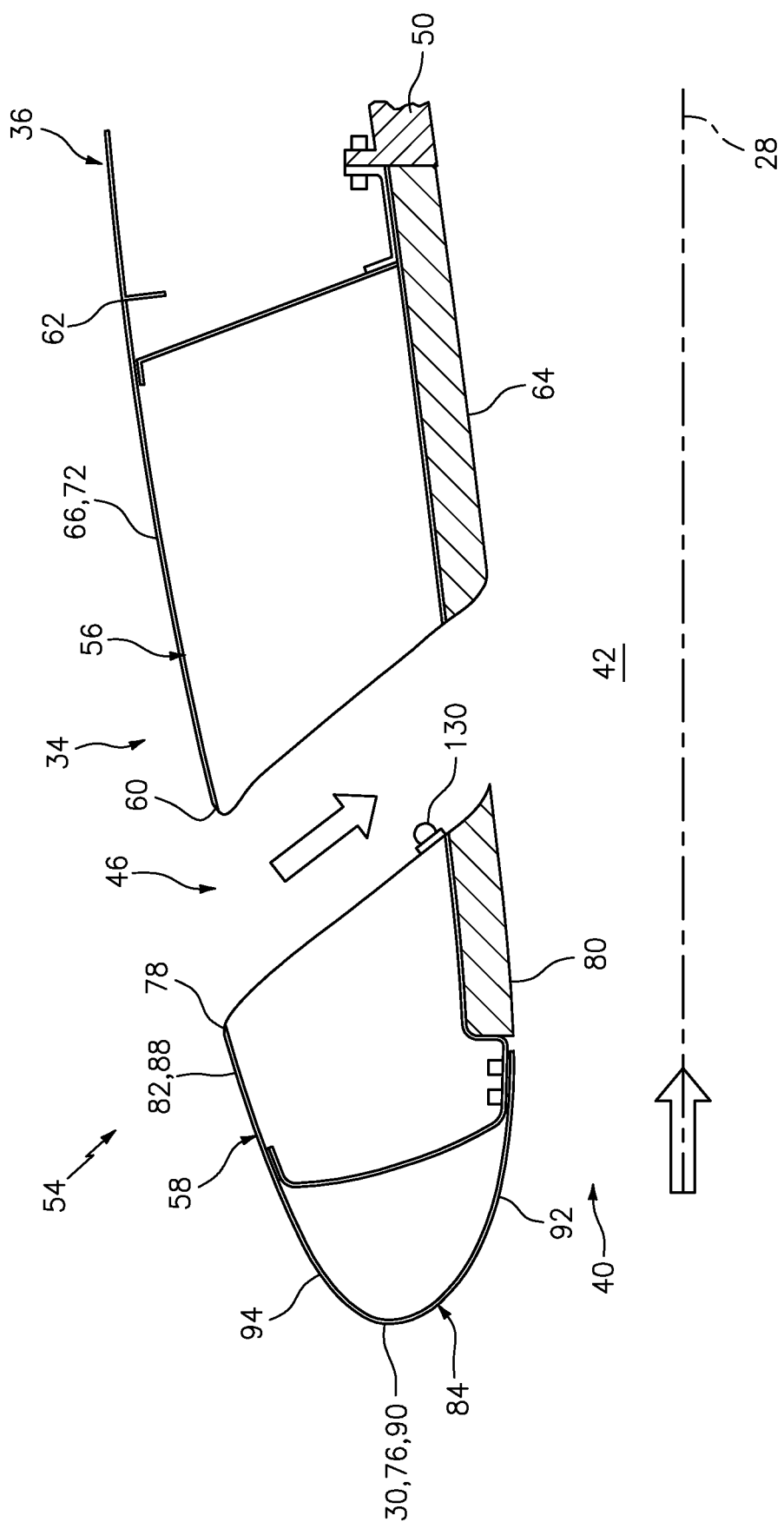
FIG. 5 is a partial side sectional illustration of the forward portion of the aircraft propulsion system with the translatable inlet in the extended position.

FIGS. 4 and 5 are schematic side sectional illustrations of an assembly 54 of the nacelle 22 of FIG. 1. This nacelle assembly 54 includes the inlet structure 34 and the fan cowls 36 (one shown).

The inlet structure 34 of FIGS. 4 and 5 includes a fixed inlet segment 56 and a translating inlet segment 58; e.g., a translating inlet lip structure. The fixed inlet segment 56 may be configured as a tubular body. The fixed inlet segment 56 of FIGS. 1 and 2, for example, extends circumferentially around the centerline 28 in a full hoop. The fixed inlet segment 56 also extends longitudinally between a forward end thereof 60 and an aft end 62 of the inlet structure 34.

Figure 6:
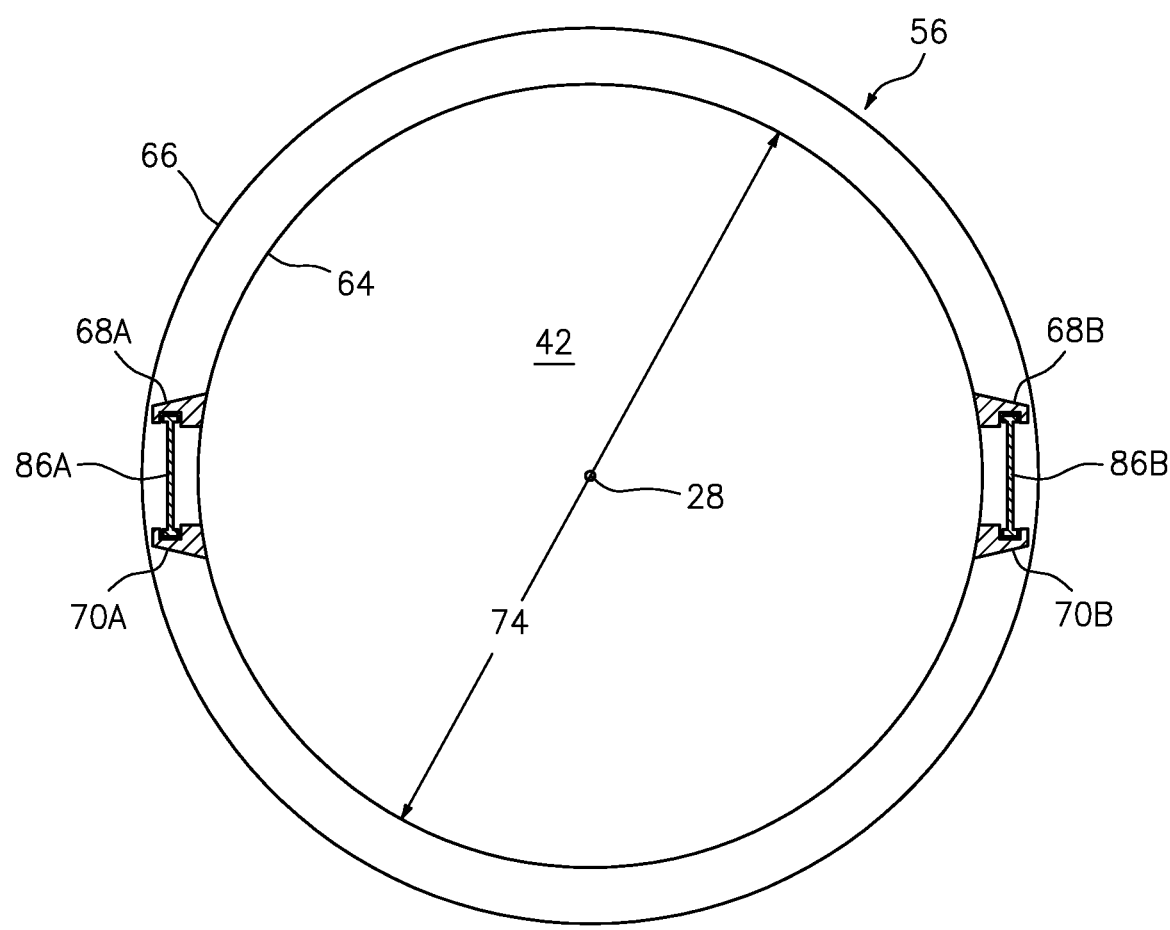
FIG. 6 is a cross-sectional illustration of a nacelle for the aircraft propulsion system along the line 6-6 in FIG. 1.
Figure 7:
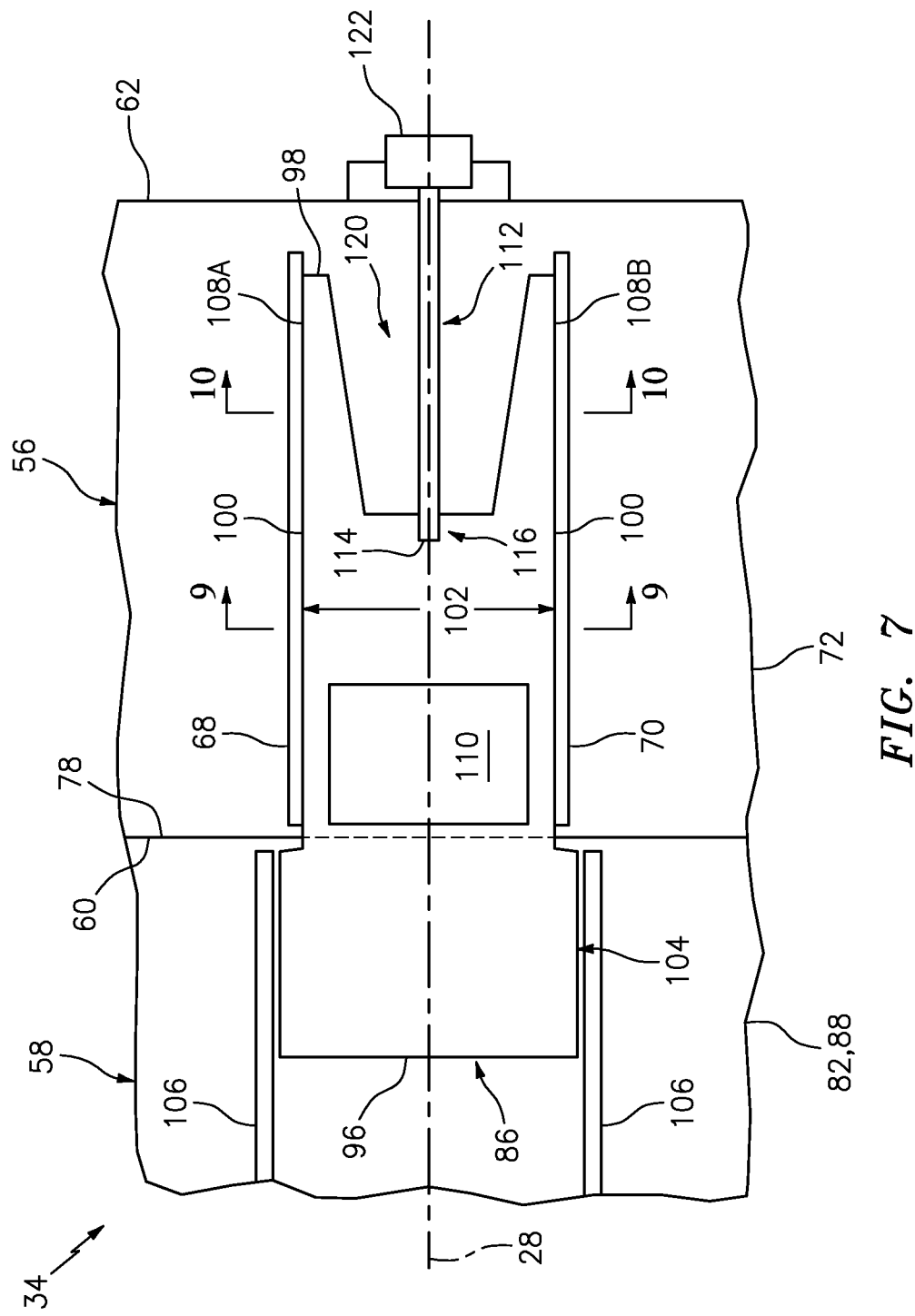
FIG. 7 is a schematic illustration of a portion of a nacelle inlet structure with the translatable inlet in the retracted position.
Figure 8:
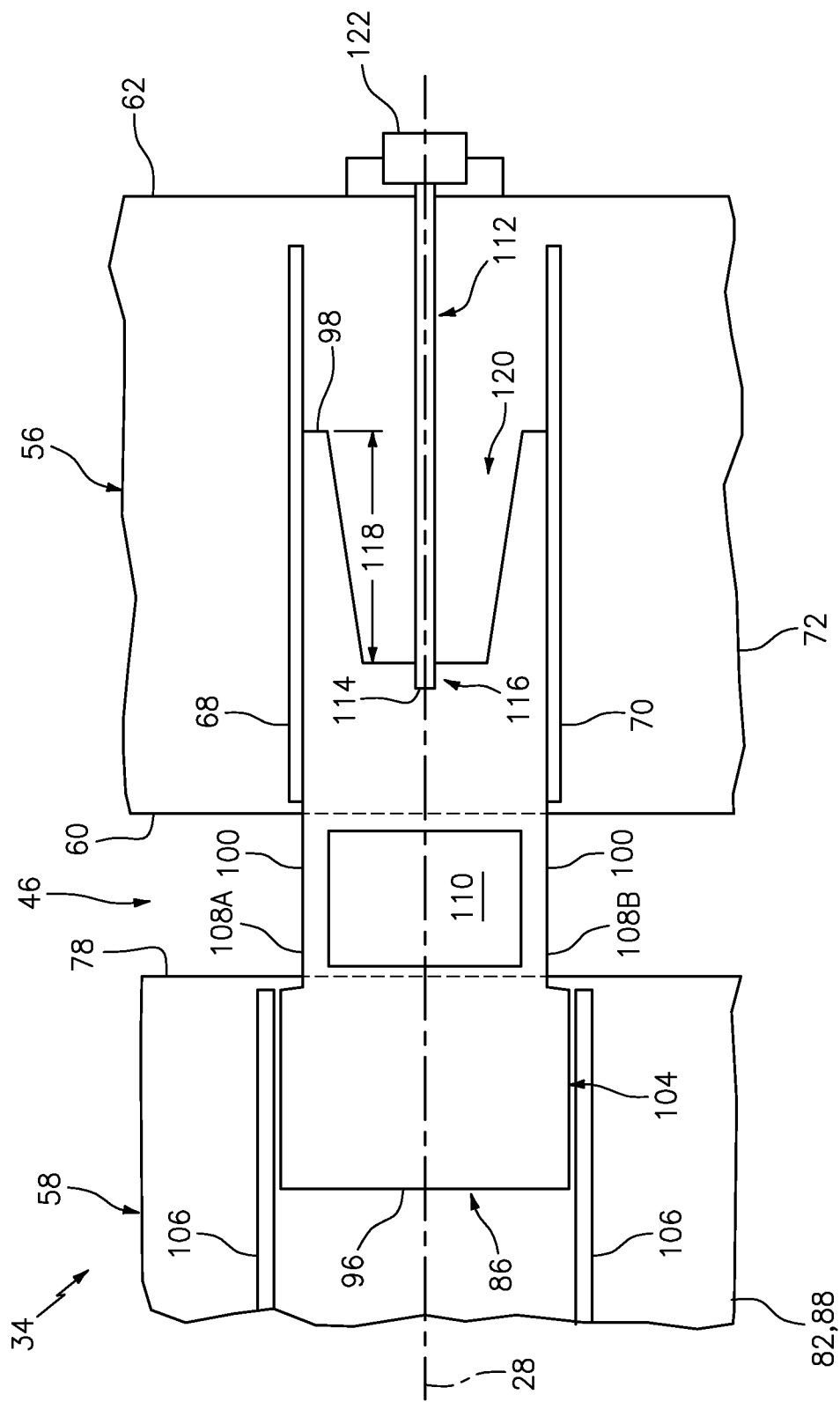
FIG. 8 is a schematic illustration of a portion of the nacelle inlet structure with the translatable inlet in the extended position.

Referring to FIGS. 4 and 5, the fixed inlet segment 56 includes a fixed inner barrel 64 (e.g., tubular interior skin) and a fixed outer barrel 66 (e.g., tubular exterior skin). Referring to FIGS. 6-8, the fixed inlet segment 56 also includes one or more sets (e.g., pairs) of tracks 68A-B (generally referred to as "68") and 70A-B (generally referred to as "70"); e.g., rails.

Referring to FIGS. 4 and 5, the fixed inner barrel 64 extends circumferentially around the centerline 28 (see also FIG. 6). The fixed inner barrel 64 extends longitudinally along the centerline 28 between the forward end 60 and the aft end 62.

The fixed inner barrel 64 may be configured to attenuate noise generated during propulsion system 20 operation and, more particularly for example, noise generated by rotation of the fan. The fixed inner barrel 64 of FIG. 4, for example, includes at least one tubular acoustic panel or an array of arcuate acoustic panels arranged around the centerline 28. Each acoustic panel may include a porous (e.g., honeycomb) core bonded between a perforated face sheet and a non-perforated back sheet, where the perforated face sheet faces radially inward and provides an outer boundary for a longitudinally portion of the gas path. Of course, various other acoustic panel types and configurations are known in the art, and the present disclosure is not limited to any particular ones thereof.

The fixed outer barrel 66 has a tubular outer barrel skin 72 that extends circumferentially around the centerline 28 (see also FIG. 6). The fixed outer barrel 66 extends longitudinally along the centerline 28 between the forward end 60 and the aft end 62.

Referring to FIG. 6, the sets of tracks 68 and 70 are arranged circumferentially about the centerline 28. The two sets of tracks 68 and 70 of FIG. 6, for example, are arranged at opposing sides of the fixed inlet segment 56; e.g., diametrically opposed. Of course, in other embodiments, the fixed inlet segment 56 may include a different number of tracks; e.g., the segment 56 may include 3 or more sets of tracks 68 and 70.

Figure 9:
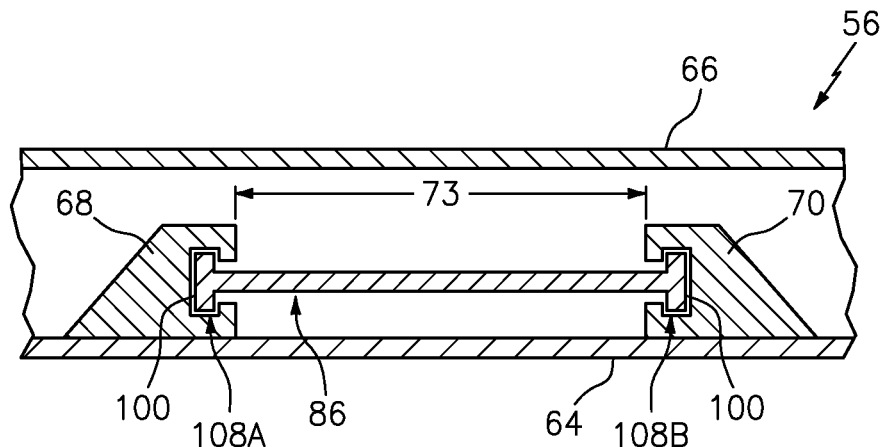
FIG. 9 is a partial sectional illustration of the nacelle inlet structure portion along the line 9-9 in FIG. 7.
Figure 10:
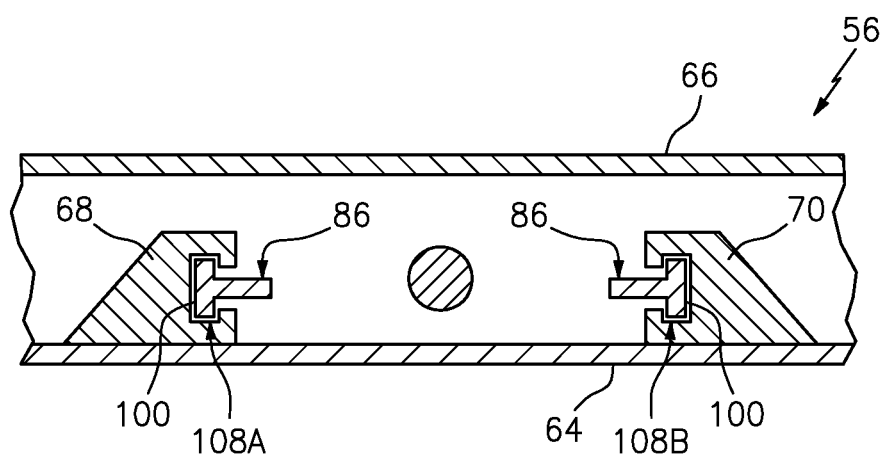
FIG. 10 is a partial sectional illustration of the nacelle inlet structure portion along the line 10-10 in FIG. 7.

Each of the tracks 68, 70 in FIGS. 7 and 8 extends longitudinally along the centerline 28 between opposing forward and aft ends. Referring to FIGS. 9 and 10, each of the tracks 68 and 70 is arranged within a cavity between the fixed inner barrel 64 and the fixed outer barrel 66. In the specific arrangement of FIGS. 9 and 10, each track 68, 70 is mounted (e.g., mechanically fastened and/or bonded) to the fixed inner barrel 64 of the fixed inlet segment 56. The present disclosure, however, is not limited to such a mounting arrangement. For example, in other embodiments, the tracks 68 and 70 may be mounted to an internal support structure between the fixed inner and outer barrels 64 and 66.

Referring to FIG. 9, the first track 68 and the second track 70 of a respective set of tracks may be arranged facing one another; e.g., channels in the tracks 68 and 70 may face one another. These first and second tracks 68 and 70 are separated by a lateral distance 73. The lateral distance 73 may be less than one radian about the centerline 28; e.g., less than about 0.6 or 0.4 radians. The lateral distance 73 may also or alternatively be less than about one half or one third of a diameter 74 (see FIG. 6) of the inlet structure 34 at (e.g., on, adjacent or proximate) or about an interface between the fixed inlet segment 56 and the translating inlet segment 58. The present disclosure, however, is not limited to the foregoing exemplary track lateral distances.

In the specific embodiments of FIG. 9, each track 68, 70 is configured as a C-channel track. The present disclosure, however, is not limited to the foregoing exemplary track configuration.

Referring to FIGS. 1 and 2, the translating inlet segment 58 may be configured as a tubular body. The translating inlet segment 58 of FIGS. 1 and 2, for example, extends circumferentially around the centerline 28 in a full hoop. The translating inlet segment 58 also extends longitudinally between a forward end 76 (e.g., the nacelle forward end 30) and an aft end 78 thereof.

Referring to FIGS. 4 and 5, the translating inlet segment 58 includes a translating inner barrel 80 (e.g., tubular interior skin), a translating outer barrel 82 (e.g., tubular exterior skin) and an annular inlet lip 84. The translating inlet segment 58 also includes one or more slider beams 86A-B (generally referred to as "86"); e.g., see FIGS. 6-8.

Referring to FIGS. 4 and 5, the translating inner barrel 80 extends circumferentially around the centerline 28 (see also FIG. 6). The translating inner barrel 80 extends longitudinally along the centerline 28 from the inlet lip 84 to the aft end 78.

The translating inner barrel 80 may be configured to attenuate noise generated during propulsion system 20 operation and, more particularly for example, noise generated by rotation of the fan. The translating inner barrel 80 of FIG. 4, for example, includes (but may alternatively be configured without) at least one tubular acoustic panel or an array of arcuate acoustic panels arranged around the centerline 28. Each acoustic panel may include a porous (e.g., honeycomb) core bonded between a perforated face sheet and a non-perforated back sheet, where the perforated face sheet faces radially inward and provides an outer boundary for a longitudinally portion of the gas path. Of course, various other acoustic panel types and configurations are known in the art, and the present disclosure is not limited to any particular ones thereof.

The translating outer barrel 82 has a tubular outer barrel skin 88 that extends circumferentially around the centerline 28. The translating outer barrel 82 extends longitudinally along the centerline 28 from the inlet lip 84 to the aft end 78.

The inlet lip 84 forms a leading edge 90 of the nacelle 22 as well as the primary airflow inlet 40 into the inlet passage 42. The inlet lip 84 has a cupped (e.g., generally U-shaped) cross-sectional geometry, which extends circumferentially as an annulus around the centerline 28. The inlet lip 84 includes an inner lip skin 92 and an outer lip skin 94, which skins 92 and 94 may be formed together from a generally contiguous sheet material, which may be metal or composite material (e.g., fiber-reinforced composite) as described below in further detail.

The inner lip skin 92 extends axially from an intersection with the outer lip skin 94 at the nacelle forward end 30 to the translating inner barrel 80, which intersection may be at an axially forwardmost point on the inlet lip 84. An aft end of the inner lip skin 92 is attached to a forward end of the translating inner barrel 80 with, for example, one or more fasteners; e.g., rivets, bolts, etc. The inner lip skin 92 may also or alternatively be bonded (e.g., welded, brazed, adhered, etc.) to the inner barrel 80. Of course, the present disclosure is not limited to any particular attachment techniques between the inlet lip 84 and the translating inner barrel 80.

The outer lip skin 94 extends axially from the intersection with the inner lip skin 92 at the nacelle forward end 30 to the translating outer barrel 82. The outer lip skin 94 and the skin 88 of the translating outer barrel 82 may be formed together from a generally contiguous sheet material.

Referring to FIG. 6, the slider beams 86 are arranged circumferentially about the centerline 28. The slider beams 86 of FIG. 6, for example, are arranged at opposing sides of the translating inlet segment 58; e.g., diametrically opposed. Of course, in other embodiments, the translating inlet segment 58 may include a different number of slider beams 86; e.g., the segment 58 may include 3 or more slider beams 86.

Figure 12:
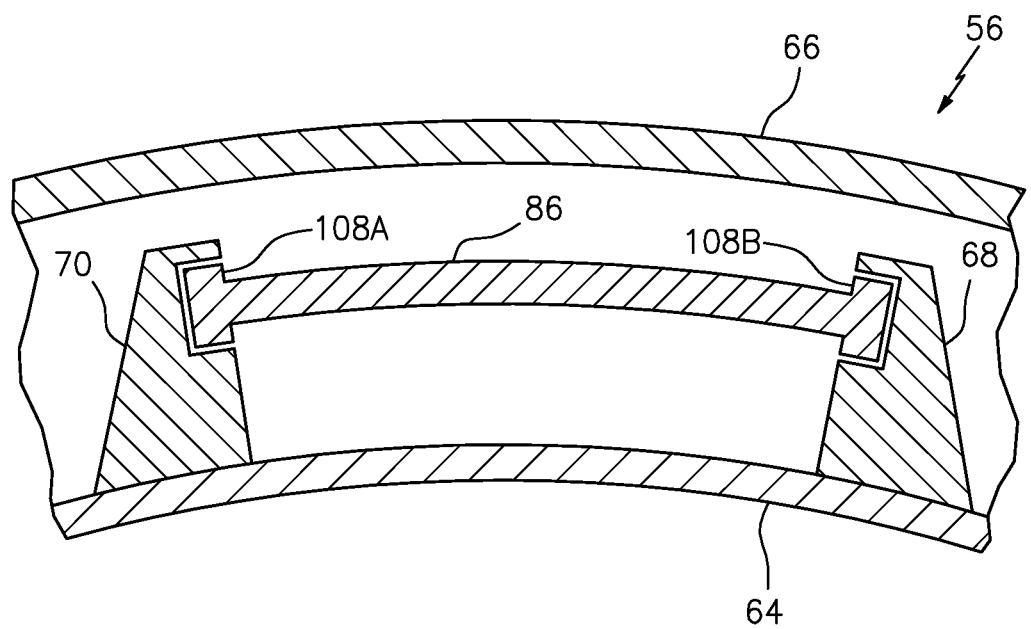
FIG. 12 is a is a partial sectional illustration of another nacelle inlet structure portion.

Referring to FIGS. 7 and 8, each slider beam 86 extends longitudinally between a forward end 96 and an aft end 98. Each slider beam 86 extends laterally (e.g., circumferentially or tangentially) between opposing sides 100. A lateral geometry of each slide beam 86 may be straight (e.g., planar) as shown in FIGS. 6 and 9, or alternatively bowed (e.g., arcuate) as shown in FIG. 12. Each slider beam 86 has a lateral width 102 between the opposing sides 100. This lateral width 102 may be less than one radian about the centerline 28; e.g., less than about 0.6 or 0.4 radians. The lateral width 102 may also or alternatively be less than about one half or one third of the diameter 74 of the inlet structure 34 at the interface. The present disclosure, however, is not limited to the foregoing exemplary slider beam lateral widths.

The slider beam 86 of FIG. 7 includes a forward mounting portion 104 at (e.g., on, adjacent or proximate) the forward end 96. This mounting portion 104 is mounted to the translating outer barrel 82. For example, the mounting portion 104 may be mounted (e.g., mechanically fastened and/or bonded) to the skin 88 of the translating outer barrel 82. The mounting portion 104 may also or alternatively be positioned laterally between and mounted to ribs 106, which ribs extend radially inward from and provide rigidity to the skin 88 of the translating outer barrel 82.

The slider beam 86 of FIGS. 9 and 10 includes first and second track mating features 108A-B (generally referred to as "108") arranged respectively at the slider beam sides 100. In the embodiment of FIGS. 9 and 10, these mating features 108 are each configured as lugs; e.g., slides and/or rails. Each mounting feature 108 is mated with and slidable longitudinally within a channel of a respective one of the tracks 68 and 70. Referring to FIG. 7, each mounting feature 108 extends longitudinally along a respective side 100 of the slider beam 86. Of course, in other embodiments, the slider beam 86 may be configured with alternative mating features (e.g., rollers, etc.) and/or alternative track profiles.

The slider beam 86 of FIG. 7 includes at least one opening 110 (e.g., port). This opening 110 extends radially through the slider beam 86. The opening 110 thereby forms a passage through the slider beam 86.

Referring to FIGS. 7 and 8, the nacelle assembly 54 also includes one or more actuators 112; e.g., linear actuators/inline actuators. Examples of such an actuator include, but are not limited to, a hydraulic piston and a leadscrew.

Each actuator 112 is associated with a respective one of the slider beams 86. For example, each actuator 112 is circumferentially aligned with a respective one of the slider beams 86. Each actuator 112 is also laterally (e.g., centered) between a respective set of the tracks 68 and 70.

A forward end 114 of each actuator 112 is mounted (e.g., via a clevis mounting connection) to a respective one of the slider beams 86 at a connection point 116. This connection point 116 may be located a longitudinal distance 118 (see FIG. 7) forward of the aft end 98 of the slider beam 86. This distance 118 may be between one third and two thirds (e.g., about one half) a longitudinal length of each track 68, 70 and/or mounting feature 108; however, the present disclosure is not limited to such an exemplary embodiment. For example, in the specific embodiment of FIGS. 7 and 8, each actuator 112 projects longitudinally into a recess 120 in the aft end 98 of the slider beam 86 to the connection point 116. Each actuator 112 is also mounted to the fixed inlet segment 56 at, for example, its aft end 122 by a joint such as, but not limited to, a gimble joint. By mounting the actuator 112 to the fixed inlet segment 56, the inlet structure 34 and its components may be configured into a modular unit that can be mounted to and removed from the nacelle 22 as a single unit. The present disclosure, however, is not limited to such a modular configuration.

The actuators 112 are configured to longitudinally translate the translating inlet segment 58 along the centerline 28 between an aft retracted position (see FIGS. 1, 4 and 7) and a forward extended position (see FIGS. 2, 5, 8 and 11).

In the retracted position, the aft end 78 of the translating inlet segment 58 is longitudinally abutted against (e.g., directly adjacent to) the forward end 60 of the fixed inlet segment 56. The translating inlet segment 58 thereby closes the secondary airflow inlet 46 such that the inlet passage 42 (e.g., only) receives air from the primary airflow inlet 40. The translating inlet segment 58 may be disposed in this retracted position, for example, during aircraft operation such as, but not limited to, aircraft cruise and/or other conditions.

In the extended position, the aft end 78 of the translating inlet segment 58 is longitudinally separated from the forward end 60 of the fixed inlet segment 56 by a longitudinal gap; e.g., a generally annular gap. This gap forms the secondary airflow inlet 46 into the inlet passage 42. The translating inlet segment 58 thereby opens the secondary airflow inlet 46 such that the inlet passage 42 receives air from both the primary airflow inlet 40 and the secondary airflow inlet 46. The translating inlet segment 58 may be disposed in this extended position, for example, during aircraft operation such as, but not limited to, aircraft takeoff and/or landing where the gas turbine engine 24 is operated at high throttle and/or requires additional air intake.

When the translating inlet segment 58 is in the extended position of FIG. 8, air may flow around the slider beams 86 and into the inlet passage 42. Air may also flow through the opening 110 in each slider beam 86 and into the inlet passage 42. The openings 110 thereby are operable to increase an effective area of the secondary airflow inlet 46 as compared to an embodiment configured without openings 110 in the beams 86.

Referring to FIG. 1, in some embodiments, the fixed inlet segment 56 may include one or more access panels 124 (one visible in FIG. 1). Each access panel 124 is configured to provide access to the mounting point 116 (see FIGS. 7 and 8) and, thus, the mounting connection for a respective one of the actuators 112 to a respective one of the slider beams 86 when, for example, the translating inlet segment 58 is in the retracted position. For example, the access panel 124 may be circumferentially and longitudinally aligned with and thereby overlap a corresponding mounting connection.

Figure 11:
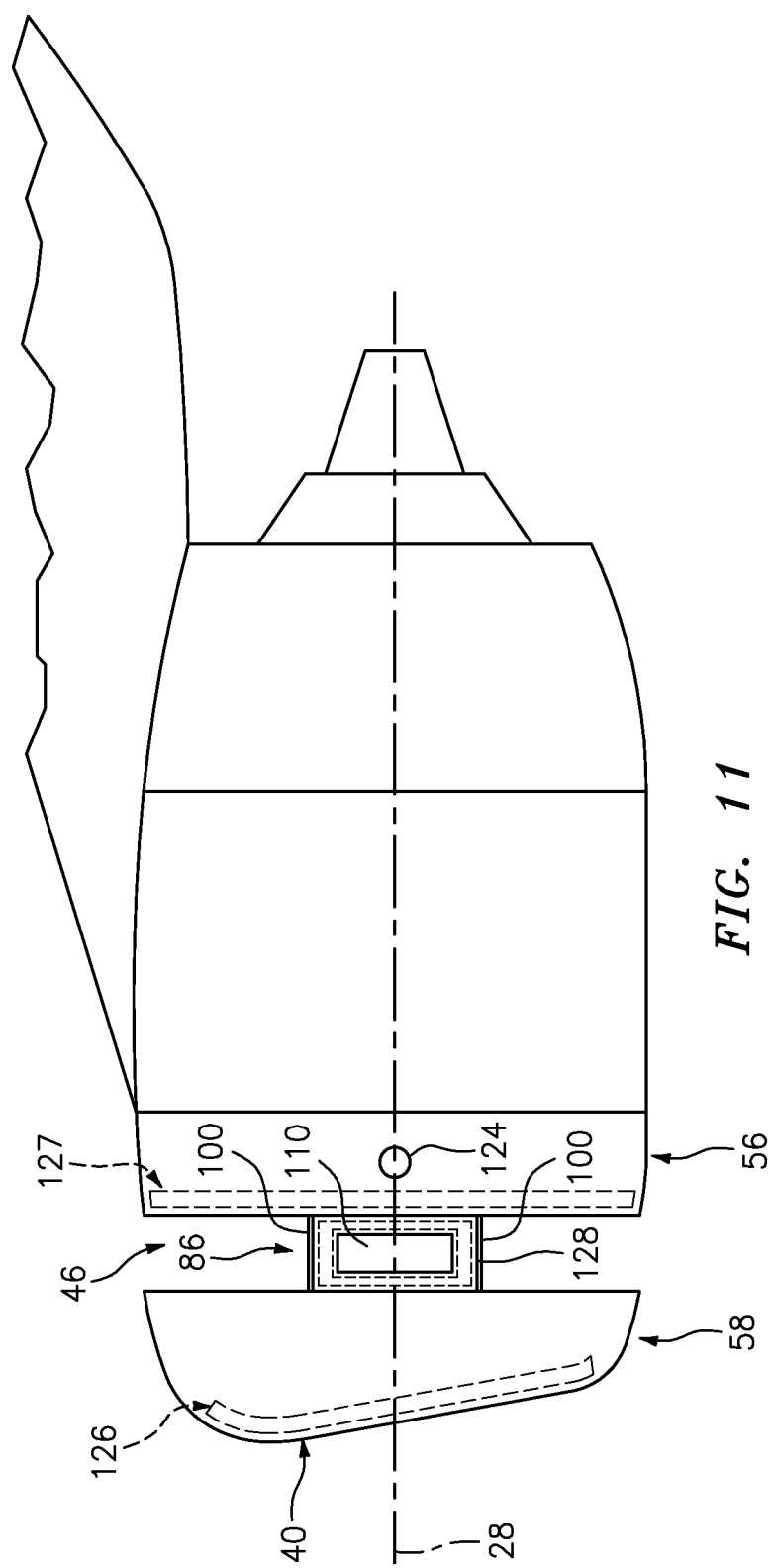
FIG. 11 is a diagrammatic illustration of the aircraft propulsion system with the translatable inlet in the extended position, which illustration schematically depicts heating elements for an anti-icing system.

Referring to FIG. 11, in some embodiments, the inlet structure 34 may be configured with an anti-icing system; e.g., a heating system. This anti-icing system may include one or more heating elements 126-128; e.g., electric heating elements (heater) and/or ducts for flowing/circulating heated air. The heating element 126 may be configured at a leading edge (e.g., the nacelle forward end 30) of the translating inlet segment 58. The heating element 127 may be configured at a leading edge (e.g., the forward end) of the fixed inlet segment 56. The heating element 128 may be configured with the respective slider beam 86. For example, the heating element 128 may completely (or partially) surround the opening 110 and/or extend along the sides 100 of the slider beam 86.

In some embodiments, referring to FIGS. 4 and 5, the assembly 54 may include a seal element 130; e.g., a bulb seal. This seal element 130 is configured to seal (e.g., close) a gap between the fixed inlet segment 56 and the translating inlet segment 58 when the translating inlet segment 58 is in the retracted position. For example, the seal element 130 of FIGS. 4 and 5 is attached to the aft end of the translating inlet segment 58 and is adapted to engage (e.g., contact) the forward end of the fixed inlet segment 56. In the retracted position, the seal element 130 may be compressed axially between the segments 56 and 58. Of course, in other embodiments, the seal element 130 (or an additional seal element) may be attached to the forward end of the fixed inlet segment 56.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A nacelle assembly for an aircraft propulsion system, comprising:
    a fixed inlet segment comprising a pair of tracks; and
    a translating inlet segment comprising a slider beam laterally between the pair of tracks, the slider beam mated with and slidable longitudinally along the pair of tracks;
    the translating inlet segment configured to translate longitudinally between a retracted position and an extended position;
    an aft end of the translating inlet segment abutted against a forward end of the fixed inlet segment when the translating inlet segment is in the retracted position;

an airflow inlet into an inlet passage of the nacelle assembly opened longitudinally between the aft end of the translating inlet segment and the forward end of the fixed inlet segment when the translating inlet segment is in the extended position; and a linear actuator mounted to and extending longitudinally between the fixed inlet segment and the slider beam, the linear actuator configured to translate the translating inlet segment between the retracted position and the extended position;

the linear actuator projecting into a recess in the slider beam such that a mounting connection between the linear actuator and the slider beam is positioned longitudinally forward of an aft end of the slider beam.

2. The nacelle assembly of claim 1, wherein
the translating inlet segment forms a second airflow inlet into the inlet passage; and
the second airflow inlet is located at a forward end of the translating inlet segment.

3. The nacelle assembly of claim 1, wherein
the fixed inlet segment further comprises a pair of second tracks; and
the translating inlet segment further comprises a second slider beam laterally between the pair of second tracks, and the second slider beam is mated with and slidable longitudinally along the pair of second tracks.

4. The nacelle assembly of claim 3, wherein the slider beam and the second slider beam are arranged at opposing sides of the translating inlet segment.

5. The nacelle assembly of claim 1, wherein the pair of tracks are separated by less than one radian.

6. The nacelle assembly of claim 1, wherein a lateral width of the slider beam is less than one half of an outer diameter of the nacelle assembly at an interface where the translating inlet segment abuts against the fixed inlet segment.

7. The nacelle assembly of claim 1, wherein the pair of tracks comprises a C-channel track.

8. The nacelle assembly of claim 1, wherein
the translating inlet segment is configured with a pair of ribs that extend longitudinally along a centerline of the nacelle assembly; and
the slider beam is positioned laterally between and attached to the pair of ribs.

9. The nacelle assembly of claim 1, wherein the fixed inlet segment is configured with an access panel for providing access to a mounting connection between the linear actuator and the slider beam when the translating inlet segment is in the retracted position.

10. The nacelle assembly of claim 1, further comprising a heating element configured at a leading edge of the translating inlet segment.

11. The nacelle assembly of claim 1, further comprising a heating element configured at a leading edge of the fixed inlet segment.

12. The nacelle assembly of claim 1, further comprising a heating element configured with the slider beam.

13. A nacelle assembly for an aircraft propulsion system, comprising:
a fixed inlet segment comprising a pair of tracks; and
a translating inlet segment comprising a slider beam laterally between the pair of tracks, the slider beam mated with and slidable longitudinally along the pair of tracks;
the translating inlet segment configured to translate longitudinally along a centerline between a retracted position and an extended position;
an aft end of the translating inlet segment abutted against a forward end of the fixed inlet segment when the translating inlet segment is in the retracted position; and
an airflow inlet into an inlet passage of the nacelle assembly opened longitudinally between the aft end of the translating inlet segment and the forward end of the fixed inlet segment when the translating inlet segment is in the extended position;
wherein the slider beam is configured with an opening that extends radially relative to the centerline through the slider beam and increases an effective area of the airflow inlet.

14. The nacelle assembly of claim 13, wherein
the slider beam extends laterally between opposing sides of the slider beam; and
a lateral geometry of the slider beam is straight between the opposing sides of the slider beam.

15. The nacelle assembly of claim 13, wherein
the slider beam extends laterally between opposing sides of the slider beam; and
a lateral geometry of the slider beam is bowed between the opposing sides of the slider beam.

16. The nacelle assembly of claim 13, further comprising a heating element configured with the slider beam and extending circumferentially about an outer periphery of the opening.

17. A nacelle assembly for an aircraft propulsion system, comprising:
a fixed inlet segment comprising a pair of tracks; and
a translating inlet segment comprising a slider beam laterally between the pair of tracks, the slider beam mated with and slidable longitudinally along the pair of tracks;
the translating inlet segment configured to translate longitudinally between a retracted position and an extended position;
an aft end of the translating inlet segment abutted against a forward end of the fixed inlet segment when the translating inlet segment is in the retracted position; and
an airflow inlet into an inlet passage of the nacelle assembly opened longitudinally between the aft end of the translating inlet segment and the forward end of the fixed inlet segment when the translating inlet segment is in the extended position;
wherein the pair of tracks comprises a first track and a second track; and
wherein the slider beam comprises a mating feature arranged within a channel of the first track, and the mating feature is configured to move longitudinally along the channel.

18. The nacelle assembly of claim 17, wherein the mating feature comprises a lug arranged within the channel, and the lug extends longitudinally along a side of the slider beam.

* * * * *